(12) United States Patent
Jakes et al.

(10) Patent No.: US 11,664,673 B2
(45) Date of Patent: May 30, 2023

(54) BATTERY INDICATOR FOR FULLY DISCHARGED STATE

(71) Applicant: LENOVO (Singapore) PTE. LTD., New Tech Park (SG)

(72) Inventors: Philip Jakes, Durham, NC (US); Jeremy R. Carlson, Cary, NC (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 246 days.

(21) Appl. No.: 17/135,269

(22) Filed: Dec. 28, 2020

(65) Prior Publication Data

US 2022/0209559 A1 Jun. 30, 2022

(51) Int. Cl.
*H02J 7/00* (2006.01)
*H01M 10/48* (2006.01)
*H01M 10/44* (2006.01)

(52) U.S. Cl.
CPC ......... *H02J 7/0071* (2020.01); *H01M 10/448* (2013.01); *H01M 10/48* (2013.01); *H01M 10/488* (2013.01); *H02J 7/0025* (2020.01); *H01M 2200/103* (2013.01); *H01M 2220/30* (2013.01)

(58) Field of Classification Search
CPC .... H02J 7/0071; H02J 7/0025; H01M 10/448; H01M 10/48; H01M 10/488; H01M 2200/103; H01M 2200/03
USPC ........................................ 320/127, 131, 135
See application file for complete search history.

(56) References Cited

U.S. PATENT DOCUMENTS

| | | | |
|---|---|---|---|
| 2006/0187072 A1* | 8/2006 | Bruce | H01M 10/48 320/136 |
| 2011/0305926 A1* | 12/2011 | Kim | H02J 7/0031 429/50 |
| 2016/0025812 A1* | 1/2016 | Bourilkov | G01R 31/3835 324/435 |
| 2017/0093184 A1* | 3/2017 | Johnson | H02J 7/0025 |

* cited by examiner

*Primary Examiner* — Zixuan Zhou
(74) *Attorney, Agent, or Firm* — Kunzler Bean & Adamson; Bruce R. Needham

(57) ABSTRACT

For indicating that a battery is fully discharged to a decommissioned state, methods, apparatus, and systems are disclosed. One apparatus includes a battery that powers an electronic device, a battery state module that comprises a non-reversible indicator, a control module coupled to the battery, and a decommission module. The decommission module receives a discharge signal from the control module and discharges the battery to a fully discharged state, where discharging the battery causes the non-reversible indicator to indicate the fully discharged state.

20 Claims, 6 Drawing Sheets

BATTERY INDICATOR FOR FULLY DISCHARGED STATE

FIELD

The subject matter disclosed herein relates to electronic devices and more particularly relates to indicating that a battery is fully discharged to a decommissioned state.

BACKGROUND

A battery stores energy. When decommissioning a battery powered electronic device, the battery can be damaged or shorted causing excess energy stored in the battery to discharge suddenly and uncontrollably. Such discharge can cause fire or physical injury or damage equipment.

BRIEF SUMMARY

A method for indicating that a battery is fully discharged to a decommissioned state is disclosed. In various embodiments, the method may be implemented by an apparatus and/or a battery pack.

One method of a battery pack for indicating that a battery is fully discharged to a decommissioned state includes detecting a decommission trigger and activating a battery discharge indicator circuit ("BDIC") in response to detecting the decommission trigger. The method includes discharging the battery pack to a fully discharged state via the BDIC, where discharging the battery pack causes a non-reversible indicator to indicate the fully discharged state.

One apparatus for indicating that a battery is fully discharged to a decommissioned state includes a battery that powers an electronic device, a battery state module that comprises a non-reversible indicator, a control module coupled to the battery, and a decommission module. The decommission module receives a discharge signal from the control module and discharges the battery to a fully discharged state, where discharging the battery causes the non-reversible indicator to indicate the fully discharged state.

One battery pack for indicating that a battery is fully discharged to a decommissioned state includes a set of battery cells, a discharge indicator that comprises a non-reversible indicator, a battery controller coupled to the battery, and a battery discharge indicator circuit ("BDIC") coupled to the battery controller. The battery controller detects a decommission trigger and the BDIC discharges the battery to a fully discharged state in response to the battery controller detecting the decommission trigger, where discharging the battery causes the discharge indicator to indicate the fully discharged state.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
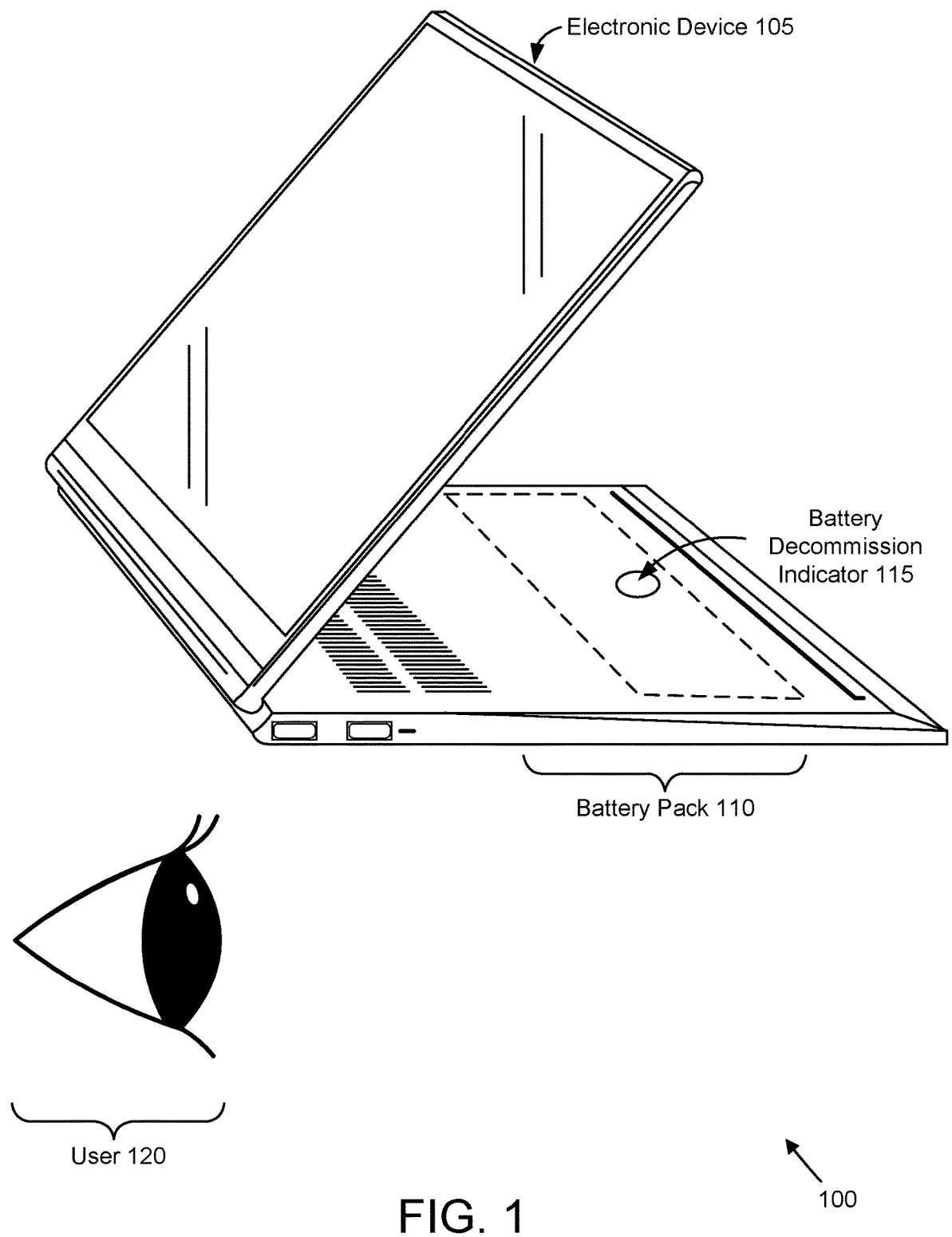
FIG. 1 is a block diagram illustrating one embodiment of a system for indicating that a battery is fully discharged to a decommissioned state.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, embodiments may take the form of a program product embodied in one or more computer readable storage devices storing machine readable code, computer readable code, and/or program code, referred hereafter as code. The storage devices are tangible, non-transitory, and/or non-transmission. The storage devices do not embody signals. In a certain embodiment, the storage devices may employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

For indicating that a battery is fully discharged to a decommissioned state, methods, systems, and apparatuses are disclosed herein. Many battery-powered electronic devices are recycled or otherwise decommissioned at end-of life. When decommissioning a battery-powered electronic device, its battery pack can be damaged or shorted causing excess energy stored in the battery pack to discharge suddenly and uncontrollably. Such discharges can cause fire or physical injury or damage equipment, particularly when lithium-based batteries are involved. Additionally, the gasses released in battery fires can be harmful to health and equipment. While fires, explosions and accidents involving lithium-based batteries are a growing concern due to the rising number of electronic devices using lithium-based batteries, the present disclosure is not limited to any particular battery chemistry.

To mitigate the risk of unintended battery discharge, the battery pack of an electronic device may be decommissioned by discharging the battery to a fully discharged state, also referred to as a decommissioned state. Note that discharging to the decommissioned state is discharge below the level of 0% state-of-charge of the battery. The battery still includes a reserve capacity when at the 0% state-of-charge, thus the discharging to the decommissioned state attempts to reduce the battery voltage to as close to 0 V as feasible.

Further, to know whether a battery has charge, you either need to know the pinout of the battery connector and use a meter, or to plug the battery into its intended system to read the battery gauge. However, this can be difficult to do during the decommissioning process, especially when there is a large volume of electronic devices to decommission and/or recycle.

The present disclosure provides an easily-viewed indicator that shows whether the battery has been fully discharged to the decommissioned state. The decommission indicator would be activated by the final current available in the battery before all reserve capacity is used and the battery is decommissioned, e.g., permanently disabled.

In some embodiments, the decommission indication is achieved using a non-reversible thermal indicator, which is heated to a temperature above operating temperatures experienced by the device, using the final current running through a resistive path under the non-reversible thermal indicator. In certain embodiments, the non-reversible thermal indicator is a label, a sticker, etc. Note that these embodiments require selection of a non-reversible thermal indicator having a transition temperature above the temperature experienced in a normal environment to avoid false-positives.

In some embodiments, the decommission indication is achieved using a non-reversible ultraviolet indicator. This mechanism may be more fail-safe than the thermal method, but slightly more complex to implement. In the UV embodiments, one or more UV LEDs would be triggered using the final current to light a non-reversible UV-sensitive portion of the outside of the battery pack. The final current refers to the current required to fully discharge the battery pack to its decommissioned state. Once the battery pack is decommissioned, it is safe for transport to a recycling facility, a refurbishing center, an electronic waste handling facility, and the like.

Disclosed herein is an apparatus for indicating that a battery is fully discharged to a decommissioned state, according to embodiments of the disclosure. The apparatus includes a battery that powers an electronic device, a battery state module that comprises a non-reversible indicator, a control module coupled to the battery, and a decommission module. The decommission module receives a discharge signal from the control module and discharges the battery to a fully discharged state, where discharging the battery causes the non-reversible indicator to indicate the fully discharged state.

In some embodiments, the battery state module comprises a temperature-sensitive non-reversible indicator and the decommission module comprises a thermal circuit located in proximity to the temperature-sensitive non-reversible indicator. In such embodiments, the decommission module discharges the battery to a fully discharged state by running a final current through the thermal circuit, where running current through the thermal circuit causes the thermal circuit to heat above a transition temperature of the non-reversible indicator, such that the temperature-sensitive non-reversible indicator is triggered to indicate the fully discharged in response to the final current running through the thermal circuit.

In some embodiments, the battery state module comprises an ultraviolet-sensitive non-reversible indicator that changes appearance when exposed to ultraviolet light and the decommission module comprises an emitter circuit located in proximity to the ultraviolet-sensitive non-reversible indicator. In such embodiments, the decommission module discharges the battery to a fully discharged state by running a final current through the emitter circuit, where running current through the emitter circuit causes the emitter circuit to emit ultraviolet light, such that the ultraviolet-sensitive non-reversible indicator is triggered to indicate the fully discharged in response to the final current running through the emitter circuit.

In some embodiments, the control module receives a decommission command from the electronic device and sends the discharge signal to the decommission module in response to the decommission command. In some embodiments, the battery comprises a plurality of battery cells, each battery cell coupled to the decommission module. In certain embodiments, the decommission module comprises a plurality of indication elements, each indication element located in proximity to a corresponding non-reversible indicator and each indication element coupled to a battery cell. In certain embodiments, the non-reversible indicator includes a visual indicator. In certain embodiments, the non-reversible indicator includes a tactile indicator. In certain embodiments, apparatus includes a fuse located between the battery and a load, wherein the decommission module is located on a cell-side of the fuse.

Disclosed is a battery pack for indicating that a battery is fully discharged to a decommissioned state, according to embodiments of the disclosure. The battery pack includes a set of battery cells, a discharge indicator that comprises a non-reversible indicator, a battery controller coupled to the battery, and a battery discharge indicator circuit ("BDIC") coupled to the battery controller. The battery controller detects a decommission trigger and the BDIC discharges the battery to a fully discharged state in response to the battery controller detecting the decommission trigger, where discharging the battery causes the discharge indicator to indicate the fully discharged state.

In some embodiments, the BDIC comprises an indication element and a switch coupled to a current path for the indication element, where running current through the indication element transitions the non-reversible indicator from a first state to a second state. In one embodiment, the switch includes a Field Effect Transistor ("FET"). Here, the battery controller switches on the FET in response to detecting the decommission trigger.

In certain embodiments, the non-reversible indicator comprises a visual indicator. In certain embodiments, the non-reversible indicator comprises a tactile indicator. In one embodiment, the indication element comprises a thermal element. In another embodiment, the indication element comprises an emitter, such as an ultraviolet light emitter.

In some embodiments, the non-reversible indicator comprises a temperature-sensitive non-reversible indicator and the BDIC comprises a thermal circuit located in proximity to the temperature-sensitive non-reversible indicator. In such embodiments, the BDIC discharges the battery to a fully discharged state by running a final current through the thermal circuit causing the thermal circuit to heat above a transition temperature of the non-reversible indicator. Here, the temperature-sensitive non-reversible indicator is triggered to indicate the fully discharged state in response to the final current running through the thermal circuit.

In some embodiments, the non-reversible indicator comprises an ultraviolet-sensitive non-reversible indicator that changes appearance when exposed to ultraviolet light and the BDIC comprises an emitter circuit located in proximity to the ultraviolet-sensitive non-reversible indicator. In such embodiments, the BDIC discharges the battery to a fully discharged state by running a final current through the emitter circuit causing the emitter circuit to emit ultraviolet light. Here, the ultraviolet-sensitive non-reversible indicator is triggered to indicate the fully discharged in response to the final current running through the emitter circuit.

In various embodiments, the battery pack also includes a fuse located between the set of battery cells and a load. In such embodiments, the BDIC is located on a cell-side of the fuse. In one embodiment, detecting the decommission trigger includes the battery controller detecting a decommissioning command received from an electronic device coupled to the battery pack. In one embodiment, detecting the decommission trigger includes the battery controller detecting a user-input decommissioning signal. In one embodiment, detecting the decommission trigger includes the battery controller detecting an unrecoverable fault in the set of battery cells.

In some embodiments, the set of battery cells includes a plurality of battery cells, where the battery pack comprises a plurality of BDICs and a plurality of discharge indicators. Here, each BDIC is coupled to one of the plurality of discharge indicators and to at least one of the plurality of battery cells. In such embodiments, discharging the battery pack to a fully discharged state comprises discharging a final current through the plurality of BDICs, thereby causing the plurality of discharge indicators to indicate the fully discharged state for each fully discharged battery cell.

Disclosed herein is a method for indicating that a battery is fully discharged to a decommissioned state. In various embodiments, the method includes detecting a decommission trigger and activating a battery discharge indicator circuit ("BDIC") in response to detecting the decommission trigger. The method includes discharging the battery pack to a fully discharged state via the BDIC, where discharging the battery pack causes a non-reversible indicator to indicate the fully discharged state.

In some embodiments, the BDIC comprises an indication element and a switch coupled to a current path for indication element, where current through the indication element transitions the non-reversible indicator from a first state to a second state. In one embodiment, the switch includes a Field Effect Transistor ("FET"). Here, the battery controller switches on the FET in response to detecting the decommission trigger.

In certain embodiments, the non-reversible indicator comprises a visual indicator. In certain embodiments, the non-reversible indicator comprises a tactile indicator. In one embodiment, the indication element comprises a thermal element. In another embodiment, the indication element comprises an emitter, such as an ultraviolet light emitter.

In some embodiments, the non-reversible indicator comprises a temperature-sensitive non-reversible indicator and the BDIC comprises a thermal circuit located in proximity to the temperature-sensitive non-reversible indicator. In such embodiments, the BDIC discharges the battery to a fully discharged state by running a final current through the thermal circuit causing the thermal circuit to heat above a transition temperature of the non-reversible indicator. Here, the temperature-sensitive non-reversible indicator is triggered to indicate the fully discharged state in response to the final current running through the thermal circuit.

In some embodiments, the non-reversible indicator comprises an ultraviolet-sensitive non-reversible indicator that changes appearance when exposed to ultraviolet light and the BDIC comprises an emitter circuit located in proximity to the ultraviolet-sensitive non-reversible indicator. In such embodiments, the BDIC discharges the battery to a fully discharged state by running a final current through the emitter circuit causing the emitter circuit to emit ultraviolet light. Here, the ultraviolet-sensitive non-reversible indicator is triggered to indicate the fully discharged in response to the final current running through the emitter circuit.

In various embodiments, the battery pack also includes a fuse located between the set of battery cells and a load. In such embodiments, the BDIC is located on a cell-side of the fuse. In one embodiment, detecting the decommission trigger includes the battery controller detecting a decommissioning command received from an electronic device coupled to the battery pack. In one embodiment, detecting the decommission trigger includes the battery controller detecting a user-input decommissioning signal. In one embodiment, detecting the decommission trigger includes the battery controller detecting an unrecoverable fault in the set of battery cells.

In some embodiments, the set of battery cells includes a plurality of battery cells, where the battery pack comprises a plurality of BDICs and a plurality of discharge indicators. Here, each BDIC is coupled to one of the plurality of discharge indicators and to at least one of the plurality of battery cells. In such embodiments, discharging the battery pack to a fully discharged state comprises discharging a final current through the plurality of BDICs, thereby causing the plurality of discharge indicators to indicate the fully discharged state for each fully discharged battery cell.

FIG. 1 depicts a system 100 for indicating that a battery is fully discharged to a decommissioned state, according to embodiments of the disclosure. The system 100 includes an electronic device 105. In various embodiments, the electronic device 105 includes a battery pack 110 and a battery decommission indicator 115. The battery decommission indicator 115 allows a user 120, e.g., a technician, to easily ascertain that the battery pack 110 has been fully discharged to the decommissioned state.

The battery pack 110 includes circuitry to both decommission the battery pack by discharging it below 0%, e.g., to permanently disable the battery pack, and also to trigger the battery decommission indicator 115. The electronic device 105 may issue a special system command to the battery pack 110, said command triggering the battery pack 110 to begin the decommissioning process. In other embodiments, the decommissioning process is triggered by a connection or switch separate from the electronic device.

In various embodiments, the battery pack 110 includes a multiple cells. In such embodiments, the battery pack 110 performs cell-balancing to maintain a consistent charge level and/or voltage level across all battery cells comprising the battery pack 110. In one embodiment, each cell is connected to a decommissioning circuit. In certain embodiments, the multiple cells may be grouped into subsets, with each group being connected to a decommissioning circuit.

One technique for balancing the battery cells is to "bleed off" excess voltage of a higher-voltage cell using an internal resistor. In some embodiments, these internal resistors may form a part of the decommissioning circuit and/or may be modified to perform the decommissioning functions described herein. In other embodiments, a dedicated, heavy-duty resistor may be used in the decommissioning circuit. In certain embodiments, a portion of the remaining energy in the battery cell is dissipated using the internal resistor(s), while a final portion is shunted through an indication element used to trigger the battery decommission indicator 115. In one embodiment, when the battery cell voltage reaches a threshold level, the remaining energy in the battery pack 110 is sent through the indication element to complete the decommissioning process. Here, battery balancing circuitry may be repurposed to determine when the threshold voltage level is reached.

Unlike a battery gauge usable to display a current state-of-charge, the battery decommission indicator 115 includes a non-reversible indicator that undergoes a permanent transformation to indicate when the battery pack 110 has been decommissioned. Moreover, the battery decommission indicator 115 does not need electrical power to show the battery state (i.e., decommissioned or not) of the battery pack 110. The battery decommission indicator 115 may include a visual indicator and/or a tactile indicator. For example, the battery decommission indicator 115 may change color, may change shape, may bulge or protrude, a gap may open, or a gap may close to indicate the decommissioned state of the battery pack 110. In certain embodiments, the battery pack 110 may include a fuse that is blown as part of the decommissioning processor in order to prevent recharging of the battery pack 110 after it is decommissioned.

Figure 2:
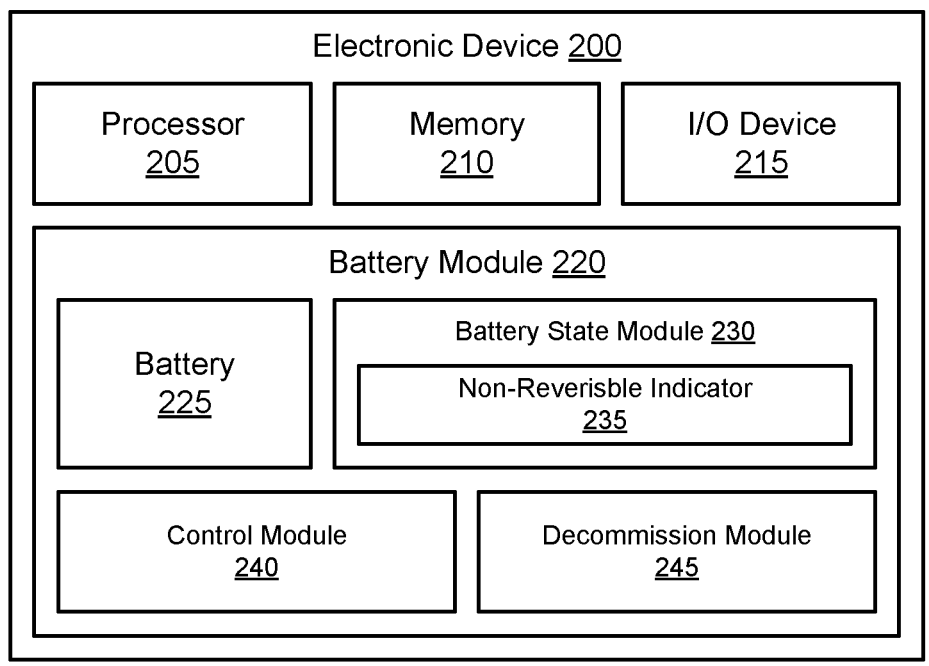
FIG. 2 is a block diagram illustrating one embodiment of an apparatus for indicating that a battery is fully discharged to a decommissioned state.

FIG. 2 depicts an electronic device 200 for indicating that a battery is fully discharged to a decommissioned state, according to embodiments of the disclosure. The electronic device 200, may be one implementation of the electronic device 105. The electronic device 200 may include a processor 205, a memory 210, an input/output ("I/O") device 215, and a battery module 220 that contains the battery 225, a battery state module 230, a control module 240 and a decommission module 245. In certain embodiments, the electronic device 200 contains the processor 205, the memory 210, and the battery module 220, but does not include the I/O device 215.

The electronic device 200 may include a body or an enclosure, with the components of the electronic device 200 being located within the enclosure. In various embodiments, the electronic device 200 includes a power adapter for providing supplemental electrical power to the electronic device 200. Moreover, the components of the electronic device 200 may be communicatively coupled to each other, for example via a computer bus.

The processor 205, in one embodiment, may comprise any known controller capable of executing computer-readable instructions and/or capable of performing logical operations. For example, the processor 205 may be a microcontroller, a microprocessor, a central processing unit ("CPU"), a graphics processing unit ("GPU"), an auxiliary processing unit, a FPGA, or similar programmable controller. In some embodiments, the processor 205 executes instructions stored in the memory 210 to perform the methods and routines described herein. The processor 205 may be communicatively coupled to the memory 210, the I/O device 215, the battery 220, and the battery module 230.

The memory 210, in one embodiment, is a computer readable storage medium. In some embodiments, the memory 210 includes volatile computer storage media. For example, the memory 210 may include a random-access memory ("RAM"), including dynamic RAM ("DRAM"), synchronous dynamic RAM ("SDRAM"), and/or static RAM ("SRAM"). In some embodiments, the memory 210 includes non-volatile computer storage media. For example, the memory 210 may include a hard disk drive, a flash memory, or any other suitable non-volatile computer storage device. In some embodiments, the memory 210 includes both volatile and non-volatile computer storage media.

In some embodiments, the memory 210 stores data relating to indicating that a battery is fully discharged to a decommissioned state. For example, the memory 210 may store state-of-charge, decommissioning signals, and the like. In some embodiments, the memory 210 also stores program code and related data, such as an operating system operating on the electronic device 200.

The I/O device 215, in one embodiment, may comprise one or more of: an input portion, an output portion, and an interface portion. In various embodiments, the input portion may be any known computer input device including a touch panel, a button, a keypad, and the like. In certain embodiments, the input portion may include a camera unit for capturing image data. In some embodiments, a user may input instructions via the camera unit using visual gestures.

In some embodiments, the input portion comprises two or more different devices, such as a camera unit and a touch panel.

In various embodiments, the output portion is configured to output visual, audible, and/or haptic signals. In some embodiments, the output portion includes an electronic display capable of outputting visual data to a user. For example, the output portion may include an LCD display, an LED display, an OLED display, a projector, or similar display device capable of outputting images, text, or the like to a user. In certain embodiments, the output portion includes one or more speakers for producing sound, such as an audible alert or notification. In some embodiments, the output portion includes one or more haptic devices for producing vibrations, motion, or other haptic output.

In some embodiments, all or parts of the output portion may be integrated with the input portion. For example, the input portion and output portion may form a touchscreen or similar touch-sensitive display. As another example, the input portion and output portion may form a display that includes haptic response mechanisms. In other embodiments, one or more output units may be located near an input unit. For example, a microphone unit, a speaker unit, a camera unit, and touchscreen unit may all be located on a common surface of the electronic device 200. The output portion may receive instructions and/or data for output from the processor 205 and/or the battery module 230.

The interface portion, in one embodiment, enables the electronic device 200 to interface with one or more external devices. For example, the interface position may support interfacing with a peripheral device, such as an external input device (e.g., mouse, keyboard, scanner, camera) and/or an external output device (e.g., display, speaker, printer), and/or an expansion device, such as a sound card, video card, networking/modem card, docking station, etc.

In some embodiments, the interface portion may include hardware circuits and/or software (e.g., drivers, modem, protocol/network stacks) to support wired or wireless communication between the electronic device 200 and another device or network. Here, the communication interface 240 is used to connect the electronic device 200 to the conference call.

A wireless connection may include a mobile telephone network. The wireless connection may also employ a Wi-Fi network based on any one of the Institute of Electrical and Electronics Engineers ("IEEE") 802.11 standards. Alternatively, the wireless connection may be a BLUETOOTH® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® ("ASTM"), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification (IrPHY) as defined by the Infrared Data Association® (IrDA®). Alternatively, the wireless connection may be a cellular telephone network communication. All standards and/or connection types include the latest version and revision of the standard and/or connection type as of the filing date of this application.

The battery module 220, in one embodiment, contains the battery 225, the control module 240 and the decommission module 245. In the depicted embodiment, the battery module 220 includes the battery state module 230; however, in other embodiments all or a portion of the battery state module 230 may be apart from the battery module 220. Note however, that the non-reversible indicator 235 is located in physical proximity to a portion of the decommission indicator, such that the decommission module 245 may trigger a non-reversible transformation in the non-reversible indicator 235. In certain embodiments, the battery module 220 may be housed within its own enclosure and/or within a sub-enclosure of the electronic device 200.

Figure 7:
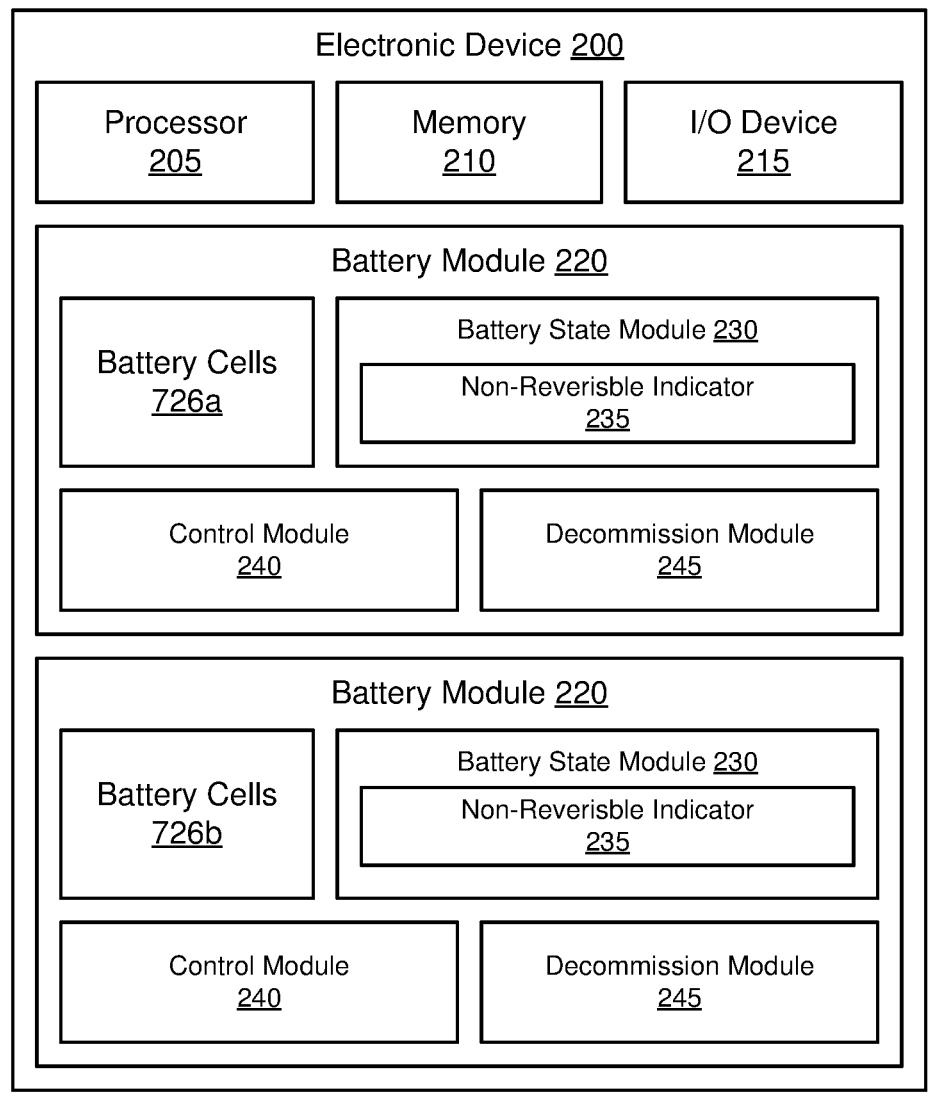
FIG. 7 is a block diagram illustrating an apparatus having a plurality of indicators for indicating that a battery is fully discharged to a decommissioned state, according to various embodiments.

The battery 225 is configured to provide power to the electronic device 200. As noted above, the battery 220 is composed of one or more battery cells. As shown in FIG. 7, in some embodiments, the battery 225 comprises a plurality of battery cells 726a and 726b, each battery cell 726a and 726b coupled to the decommission module 245. Where the battery 225 comprises a plurality of battery cells 726a and 726b, a set 726a and 726b of one or more battery cells may be packaged together with an instance of the battery state module 230 and/or an instance of the decommission module 245. Thus, while only one battery module 220 is shown, in certain embodiments the electronic device 220 may include a plurality of battery pack modules 220, each battery pack module comprising one or more of the plurality of battery cells 726a and 726b.

In various embodiments, the battery cells are composed of lithium-based chemistries. Examples of lithium-based battery chemistries include, but are not limited to, lithium-metal chemistries, lithium cobalt oxide, lithium iron phosphate, lithium manganese oxide, lithium nickel manganese cobalt oxide, and other lithium-ion chemistries. With lithium-based chemistries, the electrolyte may be liquid, solid, and/or polymer (e.g., semi-solid gel) form. The above examples are for illustration only; the discharge indication techniques described herein may be used with any type of battery composition.

In some embodiments, the battery 225 may be associated with a depth-of-discharge ("DOD") limit, i.e., a lower-limit at which battery discharge is considered complete. In certain embodiments, the battery 225 may be associated with a cutoff voltage, i.e., a lower-limit voltage at which battery discharge is considered complete. Note that the DOD limit may correspond to the cut-off voltage. As understood in the art, there is still energy remaining in the battery 225 when the cutoff voltage is reached, as the cutoff amount is selected to maximize the useful capacity of the battery 225. However, the fully discharged state (i.e., decommissioned state) achieved by the decommission module 245 refers to a state-of-charge lower still than that corresponding to the cutoff voltage. Thus, the decommission module 245 may discharge the battery 225 significantly below the conventional DOD limit for the battery 225. The decommission voltage may be significantly below the conventional cutoff voltage for the battery 225.

The battery state module 230, in one embodiment, is configured to indicate whether the battery 225 is in a decommissioned state, also referred to as a fully discharged state. As used herein, the fully discharged state refers to a state where the battery 225 is discharged to a point where there is minimal risk of shorting due to rough handling, bending, puncture, crushing, etc. In various embodiments, the decommissioned state (i.e., fully discharged state) is a state below 0% state of charge. As noted, after reaching the decommissioned state, the battery 225 is not intended to be recharged or reused without significant repair/refurbishment. Thus, the battery 225 is discharged beyond limits applicable to normal use.

The non-reversible indicator 235 may be located in physical proximity to the battery 225 and/or the decommission module 245. In one embodiment, the non-reversible indicator 235 is located on (or forms a part of) an exterior surface of the enclosure (i.e., body) of the electronic device 200. In another embodiment, the indicator 235 is located on (or forms a part of) an exterior surface of the enclosure (i.e., body) of the battery 225. In certain embodiments, where the battery 225 is internal to the electronic device 200 (e.g., embedded into the electronic device 200), the non-reversible indicator 235 may not be visible from the outside of the electronic device 200. Here, a technician may need to open and/or disassemble the electronic device 200 to observe the non-reversible indicator 235. In some embodiments, the enclosure/body of the electronic device 200 may include one or more openings or windows through which the non-reversible indicator 235 may be observed. In certain embodiments, the non-reversible indicator 235 is integrated with the enclosure (i.e., body) of the electronic device 200.

In various embodiments, the non-reversible indicator 235 is a bi-state indicator where a first state indicates a normal state (i.e., not decommissioned) of the battery 225 and the second state indicates a decommissioned state (also referred to as a fully discharged state). Running a final current (e.g., a current required to discharge the battery to its decommissioned state) through an indicator element of the decommission module 245 causes the non-reversible indicator 235 to undergo a non-reversible transition from the first state to the second state. In certain embodiments, the non-reversible transition causes a visual transformation of the non-reversible indicator 235. For example, the non-reversible indicator 235 may change color, pattern, shape, texture, or otherwise charge its appearance in a non-reversible manner. In certain embodiments, the non-reversible transition causes a tactile transformation of the non-reversible indicator 235. For example, the non-reversible indicator 235 may change pattern, shape, texture, or otherwise charge its quality in a non-reversible manner.

In some embodiments, the non-reversible indicator 235 comprises a temperature-sensitive non-reversible indicator and the decommission module 245 comprises a thermal circuit located in proximity to the temperature-sensitive non-reversible indicator. Examples of a thermal circuit and a temperature-sensitive non-reversible indicator are discussed below with reference to FIG. 4.

In some embodiments, the non-reversible indicator 235 comprises a radiation-sensitive non-reversible indicator and the decommission module 245 comprises an emitter circuit located in proximity to the radiation-sensitive non-reversible indicator. Examples of an emitter circuit and a radiation-sensitive non-reversible indicator are discussed below with reference to FIG. 5.

In various embodiments, the battery state module 230 may indicate one or more additional states of the battery 225. For example, the battery state module 230 may be configured to measure and indicate a state-of-charge of the battery 225. In certain embodiments, the battery state module 230 may control an output portion of the I/O device 215 to indicate the one or more additional states of the battery 225.

The control module 240, in one embodiment, is configured to decommission the battery 225. In some embodiments, the control module 240 is configured to detect a decommission trigger and to activate the decommission module 245, thereby causing the battery 225 to be discharged to a decommissioned state (i.e., fully discharged state). In some embodiments, the discharge trigger is a decommissioning command. For example, the control module 240 receives a decommissioning command from the electronic device 200 (i.e., from the processor 205) and sends a discharge signal to the decommission module 245 in response to the decommissioning command. In other embodiments, the decommission trigger may be a user-input trigger. In one embodiment, the control module 240 comprises a switch of the battery module 220, wherein the user toggles the switch thereby completing a circuit comprising the battery 225 and the decommission module 245 (where energizing said circuit causes the decommission module to fully discharge the battery 225 to its decommissioned state). In other embodiments, the decommission trigger may be the detection of an unrecoverable fault in the battery 225.

The decommission module 245, in one embodiment, is configured to discharge the battery 225 to a fully discharged state (i.e., decommissioned state), where discharging the battery 225 to the fully discharged state causes the non-reversible indicator 235 to indicate the fully discharged state (i.e., to indicate that the battery 225 is in the decommissioned state). Where a fuse is located between the battery 225 and a load, the decommission module 245 is located on a cell-side of the fuse.

The decommission module 245 comprises one or more indication elements, each indication element located in proximity to a corresponding non-reversible indicator 235 and each indication element coupled to at least one battery cell. One embodiment of the indication element is the thermal circuit discussed above. Another embodiment of the indication element is the emitter circuit discussed above. The indication element(s) interact with the non-reversible indicator(s) 235 when decommissioning the battery 225, e.g., by discharging the battery 225 to the fully discharged state, to cause the non-reversible transformation in the non-reversible indicator(s) 235 to indicate the fully discharged state (i.e., decommissioned state).

In certain embodiments, the fully discharged state may be defined with respect to a voltage threshold, referred to as the decommission voltage. This voltage threshold may be specific to the type of battery chemistry used by the battery 225. For example, for a lithium-ion battery having a nominal voltage of 3.7 V, the decommission voltage may be less than 2.8 V. As another example, for a lithium-ion battery, the decommission voltage may be less than 1.0 V. The decommission module 245, in one embodiment, may discharge the battery 225 significantly below a conventional voltage limit (i.e., cutoff voltage) for the battery 225.

In certain embodiments, the fully discharged state may be defined with respect to a current discharge threshold, referred to as the decommission current discharge. In one example, the current discharge threshold may be measured in units of ampere-hours (Amp-hours), coulombs, or other units of electric charge. The decommission module 245, in one embodiment, may discharge the battery 225 significantly below a conventional discharge limit (i.e., depth-of-discharge limit) for the battery 225.

In certain embodiments, the fully discharged state may be defined with respect to an energy discharge threshold, referred to as the decommission current discharge. In one example, the energy discharge threshold may be measured in units of Watt-hours, Joules, or other units of energy. The decommission module 245, in one embodiment, may discharge the battery 225 significantly below a conventional discharge limit (i.e., depth-of-discharge limit) for the battery 225.

Figure 3:
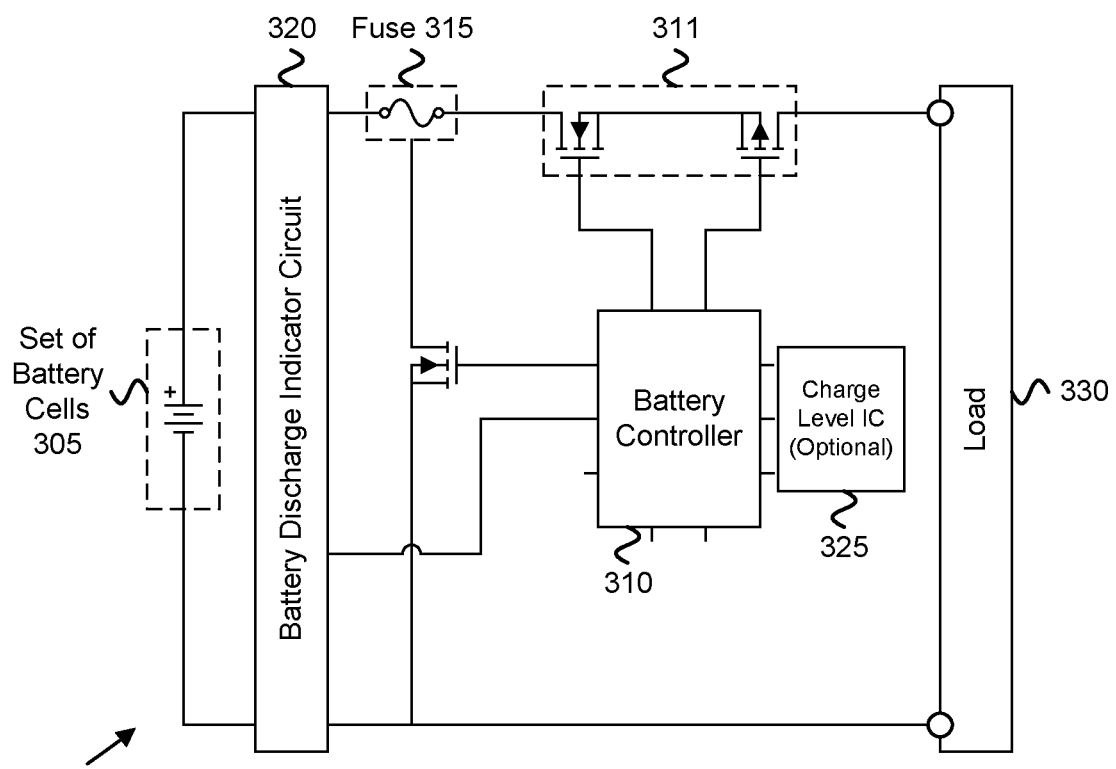
FIG. 3 is a schematic block diagram illustrating one embodiment of a battery pack that may be fully discharged to a decommissioned state.

FIG. 3 depicts circuitry of a battery pack 300 for indicating that a battery is fully discharged to a decommissioned state, according to embodiments of the disclosure. In some embodiments, the battery pack 300 is one implementation of the battery 220, the control module 240 and the decommission module 245, described above. In some embodiments, the battery pack 300 includes a set of battery cells 305 (i.e., one embodiment of the battery 225), a battery controller 310, a fuse 315, and a battery discharge indicator circuit ("BDIC") 320. In certain embodiments, the battery pack 300 also includes a change level integrated circuit ("IC") 325. The battery pack 300 is electrically coupled to a load 330. In certain embodiments, the load 330 may include the processor 205, the memory 210, the I/O device 215, etc.

Battery controller 310, in one embodiment, may be an implementation of the control module 240. The battery controller 310 is configured to detect a decommission trigger and to signal the BDIC 320 to decommission the battery by discharging the battery to a fully discharged state. In one embodiment, the decommission trigger is a decommissioning command, e.g., received from the electronic device powered by the battery pack 300. In another embodiment, the decommission trigger is a user-input signal, e.g., from a button, switch, or similar element part of the battery pack 300 and coupled to the battery controller 310.

In certain embodiments, the battery pack 300 includes one or more additional discharge circuits (not shown). The additional discharge circuit(s) may be used to discharge the set of battery cells 305 to a 0% state-of-charge. In one embodiment, the 0% state-of-charge may correspond to a cutoff voltage for the battery cells. In certain embodiments, after the set of battery cells 305 is discharged to the 0% state-of-charge (e.g., to the cutoff voltage), then the BDIC 320 may be used to decommission the set of battery cells 305 by performing a final discharge of the battery pack 300.

For example, if the state-of-charge for the battery pack 300 is greater than 0% when the battery controller 310 detects the decommission trigger, then the battery controller 310 may cause the additional discharge circuit(s) to discharge the set of battery cells 305 to a 0% state-of-charge. After the 0% state-of-charge is reached, the battery controller 310 then causes the BDIC 320 to decommission the battery pack 300 by discharging the set of battery cells 305 to the decommissioned state (fully discharged state).

In certain embodiments, the battery controller 310 may provide battery protection and/or battery management functions for the battery pack 300. Said battery protection/management functions may include, but are not limited to, overvoltage protection, undervoltage protection, overcurrent protection, overheating protection, overpressure protection, charging control, cell regulation, cell balancing, and the like. In the depicted circuitry, the battery pack 300 may include a set of protection FETs 311 used to provide battery protection functions, such as overcurrent protection. Also note that undervoltage protection will be overridden by the BDIC 320 when decommissioning the battery pack 300.

Note that the battery controller 310 may monitor the state and/or "health" of the set of battery cells 305 as represented by cell voltage (i.e., of an individual cell), total voltage, tap voltage, average temperature, cell temperature (i.e., of an individual cell), current in, current out, and the like. Where the battery controller 310 provides battery management functions, the battery controller 310 may be combined with a portion of the battery state module 225 used to determine a state of the set of battery cells 305.

The fuse 315 may be any suitable fuse used for battery and/or circuit protection. In certain embodiments, the fuse 315 is an electrical fuse that disconnects the set of battery cells 305 from the load 330, e.g., in response to an electrical fault condition. In certain embodiments, the fuse 315 is a thermal fuse that disconnects the set of battery cells 305 from the load 330 in response to an overtemperature condition. In various embodiments, the fuse 315 is a resettable fuse that automatically resets itself (i.e., resets without manual intervention or replacement) after the electrical fault condition and/or overtemperature condition has been removed and/or resolved. In other embodiments, the fuse 315 may permanently disconnect the set of battery cells 305 from the load terminals when tripped. In one embodiment, the battery controller 310 may cause the BDIC 320 to decommission the battery pack 300 if a permanent fuse 315 is tripped.

The BDIC 320, in one embodiment, may be an implementation of the decommission module 240. The BDIC 320 is coupled to the battery controller and may receive a discharge signal from the battery controller 310. The BDIC 320 may be located in physical proximity to the non-reversible indicator (not shown).

In some embodiments, the BDIC 320 comprises at least one indication element and a switch coupled to current path for the indication element, each indication element located in proximity to a corresponding non-reversible indicator and each indication element coupled to at least one battery cell of the set of battery cells 305. In one embodiment, the switch (or gate) includes one or more field effect transistors ("FET"). Here, the battery controller 310 switches on the FET in response to detecting the decommission trigger. Running current through the indication element transitions the non-reversible indicator from a first state to a second state. One embodiment of an indication element is a thermal element, as discussed in greater detail below with reference to FIG. 4. Another embodiment of an indication element is an emitter, as discussed in greater detail below with reference to FIG. 5.

When the final current is run through the BDIC 320, the indication element's proximity to the non-reversible indicator causes the non-reversible transformation in the indicator, thereby indicating that the battery pack 300 is decommissioned and the set of battery cells 305 has been discharged to its fully discharged (i.e., decommissioned) state. In certain embodiments, the BDIC 320 may be triggered in response to receiving a discharge signal from the control module. In various embodiments, the discharge signal comprises raising a voltage above a threshold amount. In other embodiments, the discharge signal may comprises lowering the voltage below a threshold amount.

Figure 8:
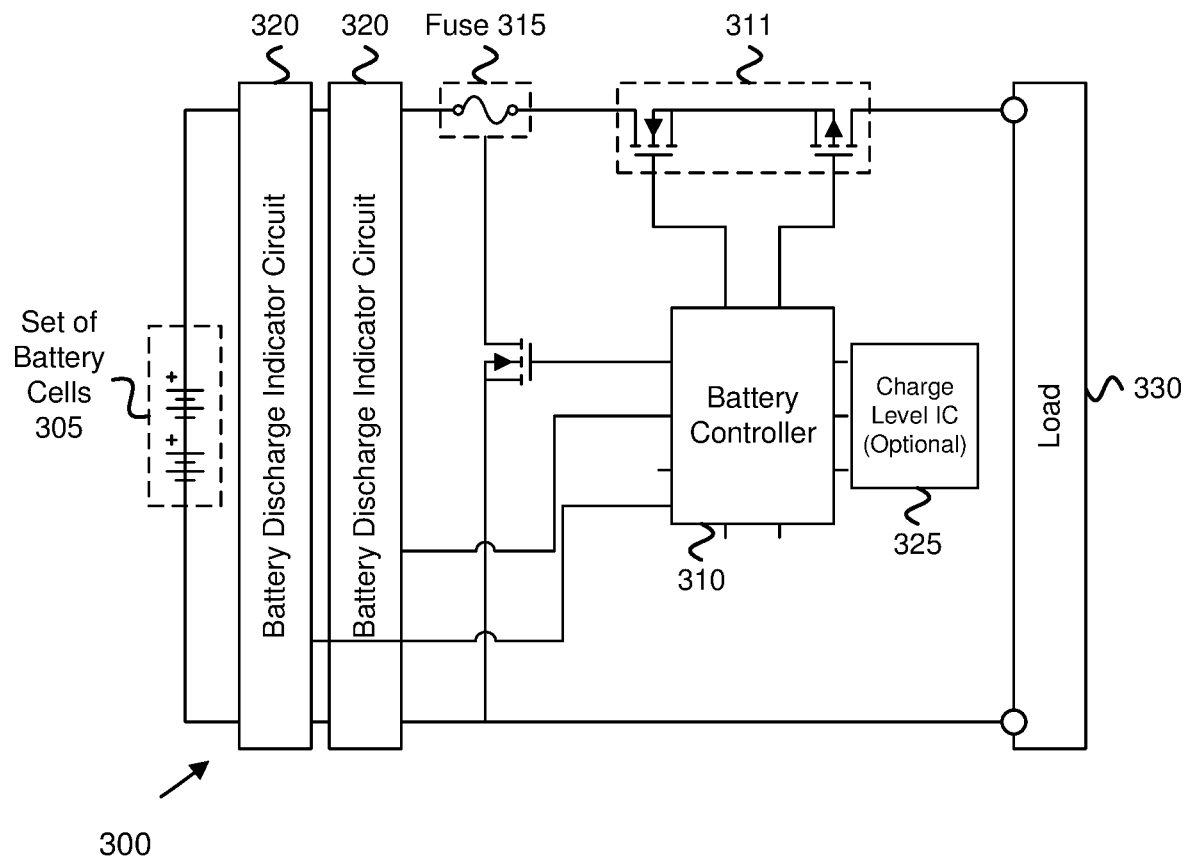
FIG. 8 is a schematic block diagram illustrating a battery pack that may be fully discharged to a decommissioned state, the battery pack having a plurality of battery discharge indicator circuits, according to various embodiments.

The set of battery cells 305, in one embodiment, is an implementation of the battery 225. As shown in FIG. 8, in some embodiments, the set of battery cells 305 includes a plurality of battery cells. In such embodiments, the battery pack 300 may include a plurality of BDICs 320 and a plurality of non-reversible indicators. Here, each BDIC 320 is coupled to one of the plurality of discharge indicators and to at least one of the plurality of battery cells.

In such embodiments, decommissioning the battery pack 300 includes discharging a final current (from the plurality of battery cells) through the plurality of BDICs 320, thereby causing the plurality of non-reversible indicators to indicate the fully discharged state for each fully discharged battery cell. In these embodiments, there are multiple discharge circuits so that each battery cell (or small group of cells) may be decommissioned independently. It is envisioned that a single command from the battery controller 310 would trigger all the discharge circuits, but each cell could be verified as decommissioned.

The charge level IC 325, in one embodiment, is configured to determine a state-of-charge (aka charge level) for the set of battery cells 305. In various embodiments, the charge level IC 325 may calculate the state-of-charge based on at least one of: current expended, present temperature, present voltage, etc.). While depicted as a separate IC, in other embodiments the charge level IC 325 may be integrated with the battery controller 310, e.g., as part of a battery management system.

In various embodiments, operation of the charge level IC 325 requires that there be enough energy in the set of battery cells 305 to run an electronic device. Here, the charge level is sent to the electronic device for presentation to a user. When the battery pack 300 is disconnected from the electronic device, knowledge of a pinout of the battery connector and a separate meter is needed to read charge level from the charge level IC 325. Alternatively, the battery pack 300 would need to be plugged into its intended system to read the charge level. As described herein, the non-reversible indicator is used to indicate whether the battery pack 300 is in a decommissioned state without needing to use the charge level IC 325.

Figure 4:
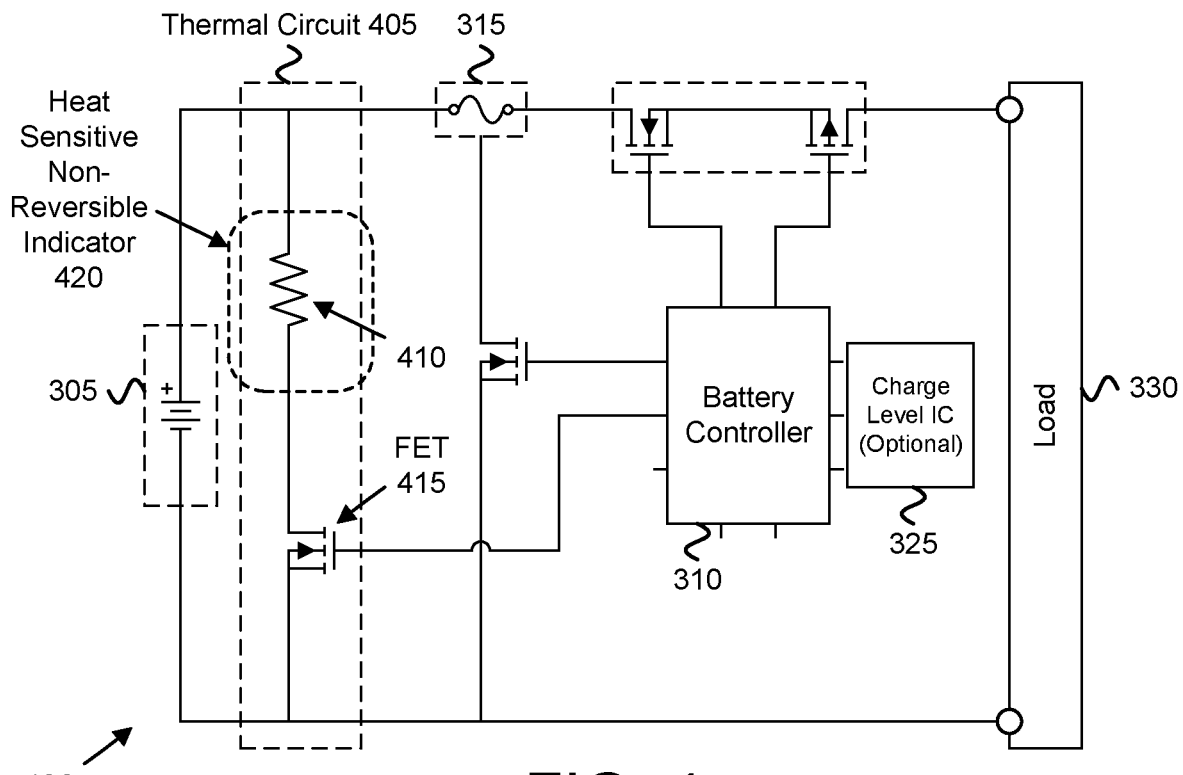
FIG. 4 is a schematic block diagram illustrating one embodiment of a battery pack having a thermal indicator circuit.

FIG. 4 depicts circuitry of a battery pack 400 for indicating that a battery is fully discharged to a decommissioned state, according to embodiments of the disclosure. In various embodiments, the battery pack 400 is one implementation of the battery pack circuit 300. The battery pack 400 includes a set of battery cells 305, a battery controller 310, a fuse 315, and a thermal circuit 405. A heat sensitive non-reversible indicator 420 is located in proximity to the thermal circuit 405. The battery pack 400 is connectable to the load 330 and may optionally include a charge level IC 325 coupled to the battery controller 310. The set of battery cells 305, the battery controller 310, the fuse 315, the charge level IC 325 and the load 330 may be substantially as described above. Here, the thermal circuit 405 may be an implementation of the BDIC 320. Additionally, the thermal circuit 405 may be one embodiment of the decommission module 240.

The thermal circuit 405 includes a resistive element 410 and a FET 415. The resistive element 410 may be one embodiment of a thermal indication element, as discussed above, and is located in physical proximity to the heat sensitive non-reversible indicator 420. The FET 415, in one embodiment, is implemented using one or more Metal Oxide Semiconductor Field Effect Transistors ("MOSFET") and/or Insulated Gate Field Effect Transistors ("IGFET").

To decommission the battery pack 400, the battery controller 310 switches on the FET 415, causing a final current to run through the thermal circuit 405. Note that the thermal circuit 405 is on the battery cell side of the fuse 315. Here, the final current discharges the set of battery cells 305 to the decommissioned state. Running the final current through the resistive element 410 causes it to heat above a transition temperature of the heat-sensitive non-reversible indicator 420, thereby transforming the heat sensitive non-reversible indicator 420 from a first state to a second state, where the second state indicates the decommissioned state of the set of battery cells 305.

Figure 5:
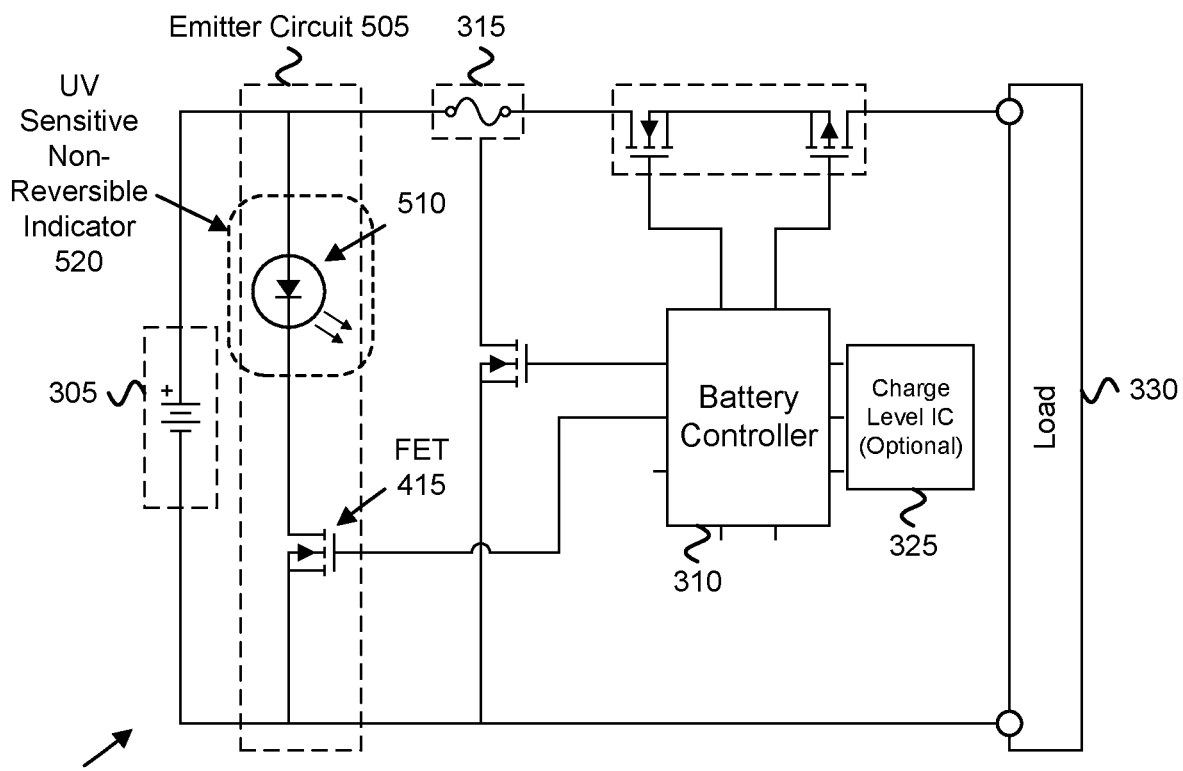
FIG. 5 is a schematic block diagram illustrating one embodiment of a battery pack having a UV emitter circuit.

FIG. 5 depicts circuitry of a battery pack 500 for indicating that a battery is fully discharged to a decommissioned state, according to embodiments of the disclosure. In various embodiments, the battery pack 500 is one implementation of the battery pack circuit 300. The battery pack 500 includes a set of battery cells 305, a battery controller 310, a fuse 315, and an emitter circuit 505. A UV sensitive non-reversible indicator 520 is located in proximity to the emitter circuit 505. The battery pack 500 is connectable to the load 330 and may optionally include a charge level IC 325 coupled to the battery controller 310. The set of battery cells 305, the battery controller 310, the fuse 315, the charge level IC 325 and the load 330 may be substantially as described above. Here, the emitter circuit 505 may be an implementation of the BDIC 320. Additionally, the emitter circuit 505 may be one embodiment of the decommission module 240.

In the depicted embodiment, the emitter circuit 505 includes a light-emitting diode 510 and a FET 415. The light-emitting diode 510 may be one embodiment of an emitter (indication element), as discussed above, and is located in physical proximity to the UV sensitive non-reversible indicator 520. The FET 415, in one embodiment, is implemented using one or more Metal Oxide Semiconductor Field Effect Transistors ("MOSFET") and/or Insulated Gate Field Effect Transistors ("IGFET").

To decommission the battery pack 500, the battery controller 310 switches on the FET 415, causing a final current to run through the emitter circuit 505. Note that the emitter circuit 505 is on the battery cell side of the fuse 315. Here, the final current discharges the set of battery cells 305 to the decommissioned state. Running the final current through the light-emitting diode 510 causes it to emit UV light, which radiates to the UV sensitive non-reversible indicator 520, thereby transforming the UV sensitive non-reversible indicator 520 from a first state to a second state, where the second state indicates the decommissioned state of the set of battery cells 305. In various embodiments, the UV sensitive non-reversible indicator 520 changes appearance when exposed to a threshold amount of UV light.

Figure 6:
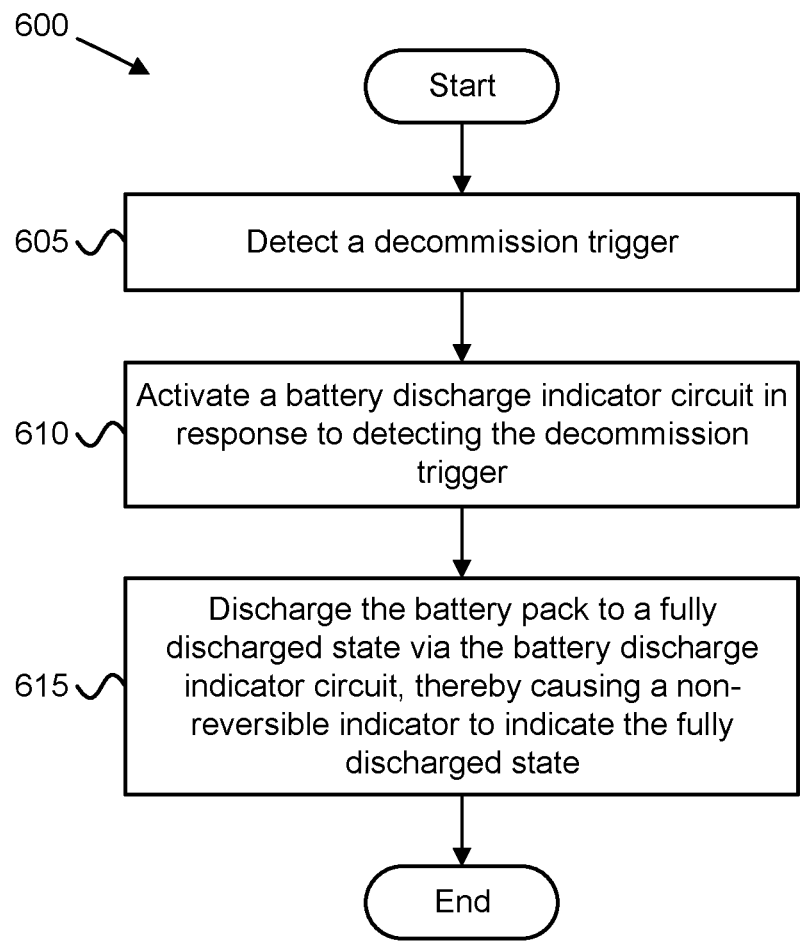
FIG. 6 is a flowchart diagram illustrating one embodiment of a method for decommissioning a battery pack.

FIG. 6 depicts a method 600 for decommissioning a battery pack, according to embodiments of the disclosure. In some embodiments, the method 600 is performed by electronic device 105, the battery pack 110, the electronic device 200, the battery module 220, the battery pack 300, the battery pack 400, and/or the battery pack 500, described above. In some embodiments, the method 600 is performed by a processor, such as a microcontroller, a microprocessor, a CPU, a GPU, an auxiliary processing unit, a FPGA, or the like.

The method 600 begins and detects 605 a decommission trigger. The method 600 includes activating 610 a battery discharge indicator circuit in response to detecting the decommission trigger. The method 600 includes discharging 615 the battery pack to a fully discharged state via the battery discharge indicator circuit, where discharging the battery pack causes a non-reversible indicator to indicate the fully discharged state. The method 600 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a battery that powers an electronic device;
   a battery state module comprising a non-reversible indicator;
   a control module coupled to the battery;
   a decommission module that:

receives a discharge signal from the control module; and discharges the battery to a fully discharged state, wherein discharging the battery to the fully discharged state causes the non-reversible indicator to undergo a permanent transformation to indicate the fully discharged state.

2. The apparatus of claim 1,
wherein the battery state module comprises a temperature-sensitive non-reversible indicator,
wherein the decommission module comprises a thermal circuit located in proximity to the temperature-sensitive non-reversible indicator,
wherein the decommission module discharges the battery to a fully discharged state by running a final current through the thermal circuit,
wherein running current through the thermal circuit causes the thermal circuit to heat above a transition temperature of the non-reversible indicator, and
wherein the temperature-sensitive non-reversible indicator is triggered to indicate the fully discharged in response to the final current running through the thermal circuit.

3. The apparatus of claim 1,
wherein the battery state module comprises an ultraviolet-sensitive non-reversible indicator that changes appearance when exposed to ultraviolet light,
wherein the decommission module comprises an emitter circuit located in proximity to the ultraviolet-sensitive non-reversible indicator,
wherein the decommission module discharges the battery to a fully discharged state by running a final current through the emitter circuit,
wherein running current through the emitter circuit causes the emitter circuit to emit ultraviolet light,
wherein the ultraviolet-sensitive non-reversible indicator is triggered to indicate the fully discharged in response to the final current running through the emitter circuit.

4. The apparatus of claim 1, wherein the control module receives a decommission command from the electronic device and sends the discharge signal to the decommission module in response to the decommission command.

5. The apparatus of claim 1, wherein the battery comprises a plurality of battery cells, each battery cell coupled to the decommission module.

6. The apparatus of claim 1, wherein the non-reversible indicator comprises a visual indicator.

7. The apparatus of claim 1, wherein the non-reversible indicator comprises a tactile indicator.

8. A battery pack comprising:
a set of battery cells;
a discharge indicator comprising a non-reversible indicator;
a battery controller coupled to the battery that detects a decommission trigger;
a battery discharge indicator circuit ("BDIC") coupled to the battery controller, wherein the BDIC discharges the set of battery cells to a fully discharged state in response to the battery controller detecting the decommission trigger, wherein discharging the set of battery cells causes the discharge indicator to undergo a permanent transformation to indicate the fully discharged state.

9. The battery pack of claim 8,
wherein the BDIC comprises an indication element and a Field Effect Transistor ("FET") coupled to current path for indication element,
wherein the battery controller switches on the FET in response to detecting the decommission trigger,
wherein current through the indication element transitions the non-reversible indicator from a first state to a second state.

10. The battery pack of claim 9, wherein the non-reversible indicator comprises a visual indicator.

11. The battery pack of claim 9, wherein the non-reversible indicator comprises a tactile indicator.

12. The battery pack of claim 8,
wherein the non-reversible indicator comprises a temperature-sensitive non-reversible indicator,
wherein the BDIC comprises a thermal circuit located in proximity to the temperature-sensitive non-reversible indicator,
wherein the BDIC discharges the set of battery cells to a fully discharged state by running a final current through the thermal circuit causing the thermal circuit to heat above a transition temperature of the non-reversible indicator, and
wherein the temperature-sensitive non-reversible indicator is triggered to indicate the fully discharged state in response to the final current running through the thermal circuit.

13. The battery pack of claim 8,
wherein the non-reversible indicator comprises an ultraviolet-sensitive non-reversible indicator that changes appearance when exposed to ultraviolet light,
wherein the BDIC comprises an emitter circuit located in proximity to the ultraviolet-sensitive non-reversible indicator,
wherein the BDIC discharges the set of battery cells to a fully discharged state by running a final current through the emitter circuit causing the emitter circuit to emit ultraviolet light,
wherein the ultraviolet-sensitive non-reversible indicator is triggered to indicate the fully discharged state in response to the final current running through the emitter circuit.

14. The battery pack of claim 8, further comprising a fuse located between the set of battery cells and a load, wherein the BDIC is located on a cell-side of the fuse.

15. The battery pack of claim 8, wherein the battery controller detecting the decommission trigger comprises detecting one or more of: a decommissioning command received from an electronic device coupled to the battery pack, a user-input decommissioning signal, and an unrecoverable fault in the set of battery cells.

16. The battery pack of claim 8, wherein the set of battery cells comprises a plurality of battery cells and wherein the battery pack comprises a plurality of battery discharge indicator circuits ("BDICs") and a plurality of discharge indicators, each BDIC coupled to one of the plurality of discharge indicators and to at least one of the plurality of battery cells.

17. A method of a battery pack comprising:
detecting a decommission trigger;
activating a battery discharge indicator circuit ("BDIC") in response to detecting the decommission trigger; and
discharging the battery pack to a decommissioned state via the BDIC,
wherein discharging the battery pack causes a non-reversible indicator to undergo a permanent transformation to indicate the decommissioned state.

18. The method of claim 17,
wherein the non-reversible indicator comprises a temperature-sensitive non-reversible indicator, wherein the BDIC comprises a thermal circuit located in proximity to the temperature-sensitive non-reversible indicator, wherein discharging the battery pack to a decommissioned state comprises running a final current through the thermal circuit causing the thermal circuit to heat above a transition temperature of the non-reversible indicator, and wherein the temperature-sensitive non-reversible indicator is triggered to indicate the decommissioned state in response to the final current running through the thermal circuit.

19. The method of claim 17, wherein the non-reversible indicator comprises an ultraviolet-sensitive non-reversible indicator that changes appearance when exposed to ultraviolet light, wherein the BDIC comprises an emitter circuit located in proximity to the ultraviolet-sensitive non-reversible indicator, wherein discharging the battery pack to a decommissioned state comprises running a final current through the emitter circuit causing the emitter circuit to emit ultraviolet light, wherein the ultraviolet-sensitive non-reversible indicator is triggered to indicate the decommissioned state in response to the final current running through the emitter circuit.

20. The method of claim 17, wherein detecting the decommission trigger comprises receiving a decommissioning command from an electronic device coupled to the battery pack.

* * * * *